United States Patent
Shah

(10) Patent No.: US 11,319,259 B2
(45) Date of Patent: *May 3, 2022

(54) AGROCHEMICAL COMPOSITION COMPRISING ZINC, SULPHUR AND A PESTICIDAL ACTIVE INGREDIENT

(76) Inventor: Deepak Pranjivandas Shah, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/003,238

(22) PCT Filed: Mar. 9, 2012

(86) PCT No.: PCT/IN2012/000163
§ 371 (c)(1),
(2), (4) Date: Sep. 5, 2013

(87) PCT Pub. No.: WO2012/127499
PCT Pub. Date: Sep. 27, 2012

(65) Prior Publication Data
US 2013/0345052 A1    Dec. 26, 2013

(30) Foreign Application Priority Data

Mar. 10, 2011    (IN) .............. 664/MUM/2011

(51) Int. Cl.
| | | |
|---|---|---|
| *C05G 3/60* | (2020.01) | |
| *A01N 51/00* | (2006.01) | |
| *A01N 47/02* | (2006.01) | |
| *A01N 47/12* | (2006.01) | |
| *A01N 59/16* | (2006.01) | |

(52) U.S. Cl.
CPC .............. *C05G 3/60* (2020.02); *A01N 47/02* (2013.01); *A01N 47/12* (2013.01); *A01N 51/00* (2013.01); *A01N 59/16* (2013.01); *Y02A 40/10* (2018.01)

(58) Field of Classification Search
CPC .... A01N 59/16; A01N 2300/00; A01N 59/02; A01N 47/02; A01N 47/12; A01N 51/00; C05G 3/02
USPC ...................................................... 504/101
See application file for complete search history.

(56) References Cited

U.S. PATENT DOCUMENTS

| | | | |
|---|---|---|---|
| 2,666,712 A | | 1/1954 | Cornwell |
| 3,873,346 A | * | 3/1975 | Sweeny ............... A01N 25/32 427/202 |
| 6,273,929 B1 | * | 8/2001 | Hobbs ...................... B01J 2/20 71/64.03 |
| 6,410,042 B1 | * | 6/2002 | Schroeder et al. .......... 424/421 |
| 7,635,404 B1 | * | 12/2009 | Devic ................... A01N 25/12 71/11 |
| 2005/0065034 A1 | * | 3/2005 | Miele ................... A01N 47/24 504/367 |
| 2005/0252408 A1 | | 11/2005 | Richardson et al. |
| 2007/0207929 A1 | | 9/2007 | Reynolds et al. |
| 2009/0162410 A1 | * | 6/2009 | Zhang et al. ............ 424/409 |
| 2009/0247597 A1 | * | 10/2009 | Vermeer ............... A01N 25/30 514/383 |

FOREIGN PATENT DOCUMENTS

| | | | | |
|---|---|---|---|---|
| CN | 1127590 A | | 7/1996 | |
| CN | 1651357 A | | 8/2005 | |
| CN | 101492311 | | 7/2009 | |
| EP | 280289 A2 | * | 8/1988 | |
| EP | 0280289 B1 | | 7/1992 | |
| EP | 1977645 A1 | | 8/2008 | |
| GB | 390512 A | | 4/1933 | |
| GB | 390521 A | * | 4/1933 | ............ A01N 59/22 |
| JP | 2007246495 A | * | 9/2007 | |

OTHER PUBLICATIONS

Singh. V. and Singh, R.N., "Effect of Mineral Nutrition and Environmental Variables on the Intensity of Wheat Spot Blotch Under Rice-Wheat System", Indian Phytopathology, 2006, vol. 59, Issue 4, pp. 417-426, Entire document.

* cited by examiner

*Primary Examiner* — Robert A Wax
*Assistant Examiner* — Courtney A Brown
(74) *Attorney, Agent, or Firm* — Ladas & Parry LLP

(57) ABSTRACT

The present invention relates to an agricultural composition comprising an effective amount of at least one pesticidal active ingredient, an effective amount of sulphur, an effective amount of zinc and at least one agrochemically acceptable excipient.

12 Claims, 3 Drawing Sheets

AGROCHEMICAL COMPOSITION COMPRISING ZINC, SULPHUR AND A PESTICIDAL ACTIVE INGREDIENT

BACKGROUND OF THE INVENTION

1. Field of the Invention

The present invention relates to an agricultural composition comprising an effective amount of at least one pesticidal active ingredient, an effective amount of sulphur, an effective amount of zinc and at least one agrochemically acceptable excipient. The invention further relates to a method of application of the agricultural composition to crops.

2. Description of the Related Art

Current farming practices are greatly challenged with an increasing labour shortage, water shortage, demand on high and quality yields, leaching of fertilizers and pesticides, micronutrient deficiencies in the soil, etc. There is a greater need today to optimize farming practices by reducing the number of applications of various fertilizers and pesticides, reduce the burden on the environment by reducing the number of chemical adjuvants and excipients being added to the soil and the crops, and despite that increase the yield of crops.

Besides the application of the larger nitrogen and phosphate fertilizers, there is a need to apply sulphur as well as zinc in the early stages of the plant cycle, for instance in some cereal crops, typically in the first 5-35 days after planting or at the time of land preparation. There is also a need to apply certain pesticides thereafter, for instance, certain insecticides to control infestation of soil hibernating pest species. It is observed that many of the above applications of fertilizers and the pesticides, due to their current forms, are applied at higher rates, with increased number of applications, which also end up placing a large burden on the environment in terms of chemical excipients and adjuvants added to the soil or applied to the crops. This also increases the cost of the application for the farmers.

In view of the same, there is a need to develop a composition, which is synergistic and provides suitable nutrients to the soil on one hand, and is also simultaneously able to provide a pesticidal control for managing various pests. There is also a need to reduce the burden on the environment, reduce the amount of chemicals added to the soil and the crop and also reduce the burden on the farmer, in terms of labour and costs.

SUMMARY OF THE INVENTION

Surprisingly, the inventors have determined that an agricultural composition comprising an effective amount of at least one pesticidal active ingredient, an effective amount of sulphur, an effective amount of zinc and at least one agrochemically acceptable excipient, not only demonstrated excellent efficacy against various pests, but also improved various physiological factors like tillering, while providing a higher yield at lower rates of application.

It has now been observed, that the compositions at very low concentrations of the active ingredients along with reduced quantities of excipients can be applied effectively, with minimum number of applications, thereby reducing the burden on the environment. The compositions disclosed herein, can also be applied effectively as a single application comprising sulphur, zinc and pesticidal active ingredient that saves not only the additional labour but also the vital cost of solo application of individual components as per conventional farming practices. The compositions also effectively address the need of Integrated Pest Management (IPM) and Integrated Nutrient Management (INM) in a single application.

BRIEF DESCRIPTION OF THE DRAWINGS

For a more complete understanding of the invention reference should now be made to the embodiments illustrated in greater detail in the accompanying drawings and described by way of embodiments of the invention.

DETAILED DESCRIPTION

Figure 1:
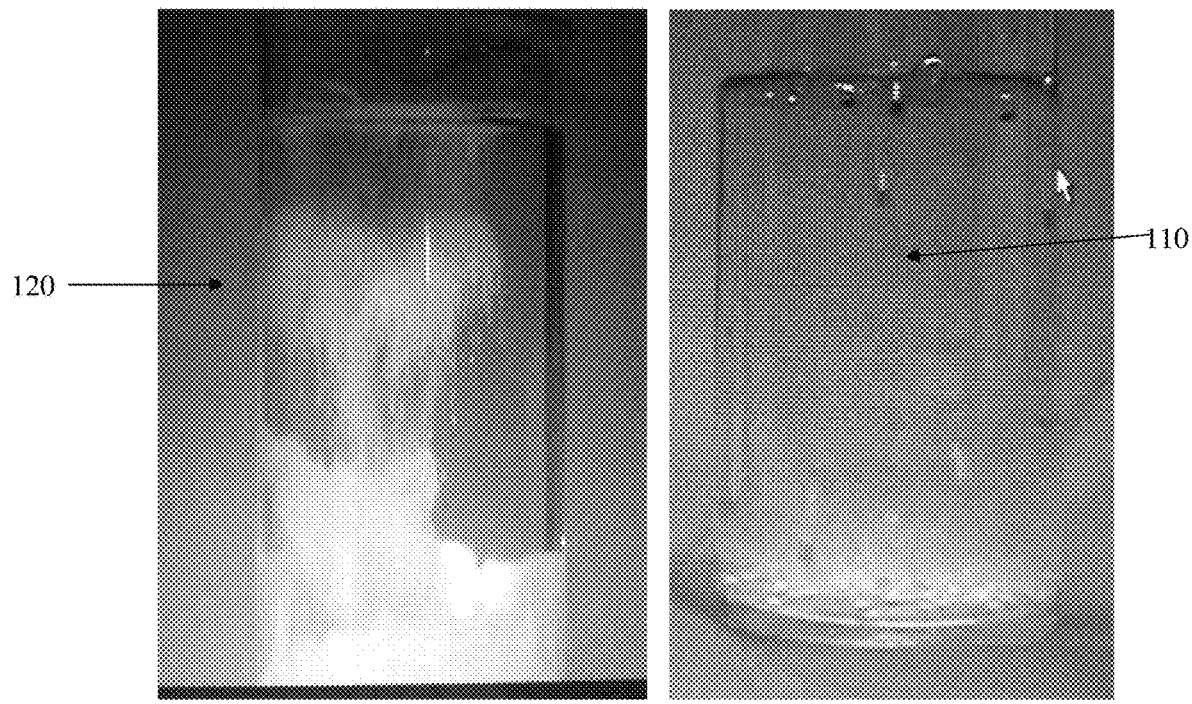
FIG. 1 illustrates a comparison of the dispersibility of the prior art fertilizer composition (110) and a composition in accordance with an embodiment of the invention (120) at time zero.

In describing the embodiments of the invention, specific terminology is resorted for the sake of clarity. However, it is not intended that the invention be limited to the specific terms so selected and it is to be understood that each specific term includes all technical equivalents that operate in a similar manner to accomplish a similar purpose.

Water dispersible granules can be defined as a formulation consisting of granules to be applied after disintegration and dispersion in water or it may be directly broadcasted. As described herein, "WG" or "WDG" refer to water dispersible granules.

As defined herein, WP refers to a wettable powder, which can be a powder formulation which may be applied as a suspension after dispersion in water or it may be directly broadcasted.

As defined herein, WS refers to water dispersible powder for slurry seed treatment.

As defined herein, "Gr" refers to granules.

As described herein, the abbreviation "DAT" refers to Days after Transplanting. As described herein, the abbreviation "DAP" refers to Days after Planting.

The present invention relates to an agricultural composition comprising an effective amount of at least one pesticidal active ingredient, an effective amount of sulphur, an effective amount of zinc and at least one agrochemically acceptable excipient.

According to an embodiment, the pesticidal active ingredient is present in the range from 0.1% to 10% of the total composition. According to an embodiment sulphur is present in the range from 30% to 90% of the total composition. According to embodiment zinc is present in the range from 2% to 20% of the total composition.

According to an embodiment, zinc can be in the form of zinc oxide. According to another embodiment, zinc can be in the form of zinc sulphate.

Preferably, zinc sulphate is in the form of zinc sulphate monohydrate.

According to an embodiment, the pesticidal active ingredient is selected from the group comprising of fungicides, acaricides, insecticides, nematicides or biocides.

According to an embodiment, the pesticidal active ingredient is an insecticide.

According to an embodiment, the insecticide is present in the range from 0.1% to 10% of the total composition. According to an embodiment sulphur is present in the range from 30% to 90% of the total composition. According to an embodiment zinc is present in the range from 2% to 20% of the total composition.

According to an embodiment, when zinc is in the form of zinc oxide, it is present in the range from 2.5% to 25% of the total composition.

According to an embodiment, when zinc is in the form of zinc sulphate, it is present in the range from 6% to 60% of the total composition.

According to an embodiment, the insecticide comprises of cartap, fipronil, pirimicarb, buprofezine, thiacloprid, acetamiprid, clothianidin, chloropyrifos diafenthiuron, novaluron, flubendiamide, spirotetramat, thiamethoxam, imidacloprid or salts thereof.

The agricultural composition can be in the form of solid, liquid or a gel. According to an embodiment, the agricultural composition can be in the form of water dispersible granules, wettable powders or broadcast granules.

According to an embodiment, wherein the composition is in the form of water dispersible granules, the particle size is in the range from 0.2μ to 50μ. Preferably the particle size is in the range of 0.2μ to 10μ.

According to an embodiment, the composition is in the form of microgranules, wherein the microgranules are in the size range of 0.1 mm to 0.5 mm, comprising particles in the size range of 0.2μ to 50μ. Preferably, the particles are in the size range of 0.2μ to 10μ

According to an embodiment, the composition is in the form of broadcast granules, wherein the broadcast granules are in the size range of 0.75 mm to 5 mm, comprising particles in the size range of 0.2μ to 50μ. Preferably, the particles are in the size range of 0.2μ to 10μ

According to an embodiment, when the composition is in the form of water dispersible granules, the dispersibility is greater than 80%. Preferably, the dispersibility of the composition is greater than 90%.

According to an embodiment, sulphur is in the range from 30% to 90%, Zinc is in the range from 2% to 20%, Fipronil or salts thereof is in the range from 0.2% to 0.8% and at least one agrochemically acceptable excipient.

According to an embodiment, sulphur is in the range from 30% to 90%, Zinc is in the range of from 2% to 20%, Imidacloprid or salts thereof is in the range from 0.3% to 4% and at least one agrochemically acceptable excipient.

According to an embodiment, sulphur is in the range from 30% to 90%, Zinc is in the range of from 2% to 20%, Cartap or salts thereof is in the range from 2% to 10% and at least one agrochemically acceptable excipient.

According to another embodiment, the composition comprising sulphur, zinc and cartap or salts thereof is in the form of wettable powder or broadcast granules which are water dispersible.

According to an embodiment, the composition is in the form of microgranules, wherein the microgranules are in the size range of 0.1 mm to 0.5 mm, comprising particles in the size range of 1μ to 50μ. Preferably, the particles are in the size range of 1μ to 15μ.

According to an embodiment, the composition is in the form of broadcast granules, wherein the broadcast granules are in the size range of 0.75 mm to 5 mm, comprising particles in the size range of 1 to 50μ. Preferably, the particles are in the size range of 1μ to 15μ.

According to an embodiment, when the composition is in the form of wettable powders, the dispersibility is greater than 65%. Preferably, the dispersibility of the composition is greater than 75%.

According to yet another embodiment, at least one agrochemically acceptable excipient can comprise surfactants or fillers. However, those skilled in the art will appreciate that it is possible to utilize additional agrochemically acceptable excipients without departing from the scope of the present invention. The agrochemically acceptable excipient is in the range from 4% to 30% of the total weight of the composition.

Surfactants which can be used as wetting agents and/or dispersing agents include sulfosuccinates, naphthalene sulfonates, sulfated esters, phosphate esters, sulfated alcohol, alkyl benzene sulfonates polycarboxylates, naphthalene sulfonate condensates, phenol sulfonic acid condensates, lignosulfonates, methyl oleyl taurates and polyvinyl alcohols. However, those skilled in the art will appreciate that it is possible to utilize other surfactants known in the art without departing from the scope of the invention.

Fillers which can optionally be used include diatomaceous earth, kaolin, precipitated silica, attapulgite and perlite. In most cases the compositions can be enabled without the use of fillers. However, those skilled in the art will appreciate that it is possible to utilize other fillers known in the art without departing from the scope of the invention.

FIG. 1 illustrates the comparison of the dispersibility of the prior art fertilizer composition (110) comprising sulphur 85%+Zinc Oxide 18% pastilles and a composition in accordance with an embodiment of the present invention (120) comprising Sulphur 78%+ZnO 10%+Fipronil 0.6% Gr., having a particle size in the range of 0.2 microns to 10 microns. at time zero. The composition in accordance with an embodiment of the present invention disperses immediately on addition to water and demonstrates a cloud formation. As seen from the figure, the prior art fertilizer does not disperse when added to water.

Figure 2:
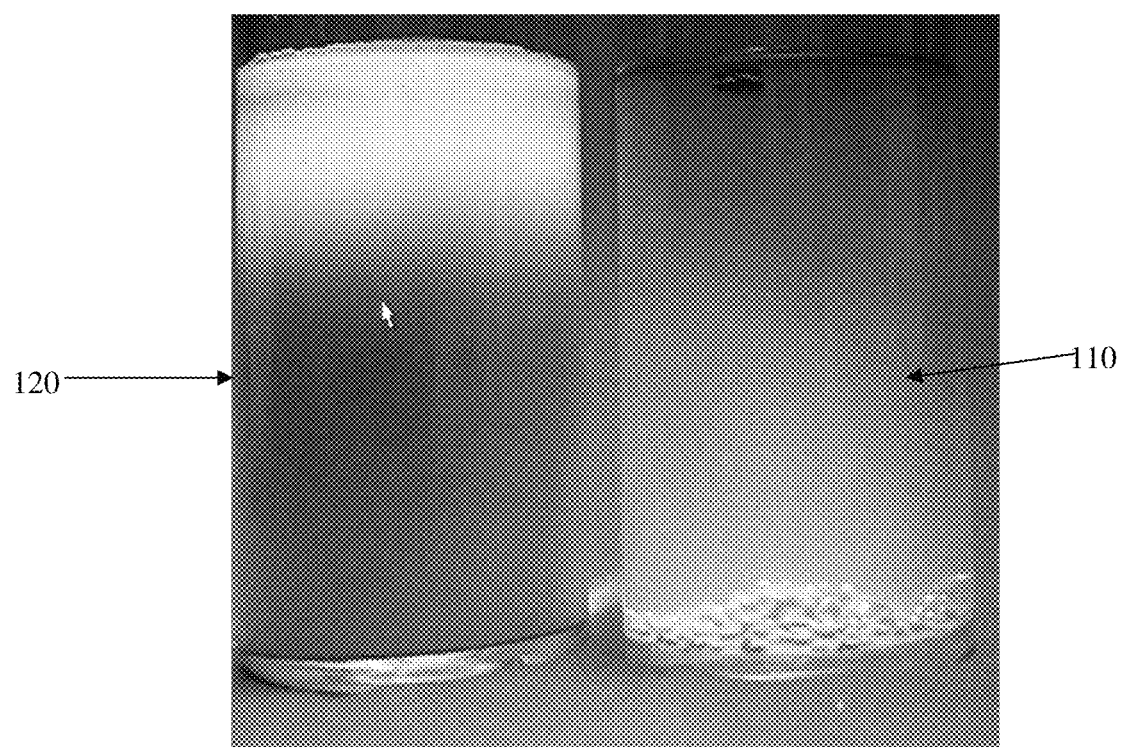
FIG. 2 illustrates a comparison of the dispersibility of the prior art fertilizer composition (110) and a composition in accordance with an embodiment of the invention (120) after 30 minutes.

FIG. 2 illustrates a comparison of the dispersibility of the prior art fertilizer composition (110) and a composition in accordance with an embodiment of the present invention (120) after 30 minutes.

Figure 3:
FIG. 3 illustrates a top view of a comparison of the dispersibility of the prior art fertilizer composition (110) and a composition in accordance with an embodiment of the invention (120) after 30 minutes.

According to an embodiment FIG. 3 illustrates a top view of a comparison of the dispersibility of the prior art fertilizer composition (110) and a composition in accordance with an embodiment of the present invention (120) after 30 minutes.

The prior art fertilizer composition (110) does not disperse even after 30 minutes and thus it cannot be effectively used in micro irrigation systems. This poses a great challenge to the end user. The composition (120) in accordance with an embodiment of the present invention remains uniformly suspended in water over an extended period of time showing a full bloomed dispersion. The composition according to the embodiment can be used effectively and efficiently in micro irrigation systems such as trickle, drip or sprinkler irrigation.

The compositions comprising sulphur, zinc and a pesticidal active ingredient can be prepared by various processes.

According to an embodiment, water dispersible granule compositions can be made by various processes such as spray drying, fluid bed spray drying, extrusion, pan granulation, etc. One way of making water dispersible granular compositions which include sulphur, zinc and the pesticidal active ingredient, involves initially blending required additives such as wetting agents, dispersing agents, fillers to obtain an additive mix. The above mixture is wet milled using a bead mill to obtain an average particle size of the mixture of less than 50μ, preferably less than 15μ, preferably 0.2 to 10μ to obtain the mill base. The mill base is granulated in an appropriate spray drier or other drying methods with an outlet of a suitable temperature followed by sieving to remove the under sized and oversized granules, to obtain a WG formulation comprising sulphur, zinc and a pesticidal active ingredient in combination.

Alternately, wettable powder compositions of sulphur, zinc and a pesticidal active ingredient can be prepared by blending required additives such as wetting agents, dispersing agents, fillers to obtain an additive mix. The mixture is then micronized using a suitable mill like fluid energy mill, jet mill, pin mill, hammer mill to an average particle size of the mixture of less than 50μ, preferably less than 15μ, preferably 1 to 15μ to get the WP formulation comprising sulphur, zinc and pesticidal active ingredient in combination. Wettable Powder can be made in broadcast granules by various processes such as pelletization, compaction etc. or other techniques known in art.

According to an embodiment, the invention relates to a method of application of an effective amount of the agricultural composition, wherein the composition is applied to crops through foliar spray or soil application or through drip irrigation or trickle irrigation. Preferably the composition is applied as a soil application, for example, broadcast granules. More preferably the composition is applied through various micro irrigation systems such as drip, trickle or sprinkler irrigation.

It has been observed that the number of applications to control wide range of pests appearing at the same time is minimized. The compositions display excellent synergy and are highly safe to the user and to the environment. The compositions are also cost-effective, as they provide much greater simultaneous control and can be used in a variety of crops with a broader spectrum of protection healthy foliage, improved crop yield and better grain quality. The agrochemical compositions in practice, reduces the number of applications of various individual fertilizer and pesticidal treatments and serves a dual purpose of simultaneously managing the damage caused by pests and meeting the fertilizer requirement in the initial stages of plant growth. One of the major advantages of the composition is the application in micro irrigation systems such as drip, trickle or sprinkler irrigation. The other advantages include reduction in the costs from water, energy, labour, chemical sources. The composition of the present invention improves plant vigour by delivering water, pesticide and nutrients directly to the plant roots and rhizophere in a single application. The composition is thereby more economical and beneficial to the end-users when compared with the present practices of solo application of the pesticide granules or zinc and sulphur fertilizer that saves not only the additional labour but also the vital cost of solo Sulphur fertilizer.

EXAMPLES

Example 1: Sulphur 30%+Fipronil 1%+Zinc Oxide 20% WG

Step 1: Preparation of 'additive mix'
30.5 parts of Sulphur (99% purity), 1.1 parts of Fipronil (95% purity), 21.1 parts of Zinc Oxide (95% purity), 5% of Naphthalene sulfonate condensate (Tammol DN), 20% of Lignin sulfonate (Reax 100), 14.3% of Kaolin (Barden clay) are blended together and 'additive mix' is prepared.

Step 2: Preparation of mill base
The above mixture is wet milled using a bead mill to obtain an average particle size, 0.2 microns to 50 microns, preferably 0.2 microns to 10 microns, to get the mill base.

Step 3: Spray granulation of mill base
The above mill base is spray granulated in a spray drier at an appropriate out let temperature followed by sieving to remove the under sized and oversized granules to get water dispersible granules of Sulphur 30%+Fipronil 1%+Zinc Oxide 20%.

Example 2: Sulphur 61%+Fipronil 0.2%+Zinc Oxide 20% WG

The mill base prepared by milling a mixture of 60.6 parts of Sulphur (99%), 0.2 parts of Fipronil (95%), and 16 parts of zinc Oxide (95%), Naphthalene sulfonate condensate (Tammol DN) (5%), Lignin sulfonate (Reax 100) (12%) and Kaolin (Barden clay) (6.2%) and is spray granulated as in Example 1 to get water dispersible granules of Sulphur 61%+Fipronil 0.2%+Zinc Oxide 20%.

Example 3: Sulphur 30%+Cartap HCL 2%+Zinc Sulphate 60% WP

Step 1: 30.5 parts of Sulphur (99%), 2.1 parts of Cartap HCL (98%), 63.2 parts of Zinc sulphate monohydrate (95%), Naphthalene sulfonate condensate (Tammol DN) (2%), Lignin sulfonate (Reax 100) (2%) and precipitated silica (0.2%) are blended together and used as 'additive mix'.

Step 2: The above mixture is then micronized using a suitable mill base to an average particle size to get wettable powder form of the composition Sulphur 30%+Cartap HCL 2%+Zinc sulphate 60%.

Example 4: Sulphur 50%+Cartap HCL 6%+Zinc Sulphate 30% WP

The mill base prepared by milling a mixture of 50.5 parts of Sulphur (99%), 6.2 parts of Cartap HCL (98%), and 32 parts of zinc sulphate monohydrate (95%), Naphthalene sulfonate condensate (Tammpl DN)(5%), Lignin sulfonate (Reax 100) (5%) and precipitated silica (1.3%) is micronized as in Example 3 to get Sulphur 50%+Cartap HCL 6%+Zinc sulphate 30% WP From the foregoing it will be observed that numerous modifications and variations can be effectuated without departing from the true spirit and scope of the novel concepts of the present invention. It is to be understood that no limitation with respect to the specific embodiments illustrated is intended or should be inferred.

Efficacy Trials:
The efficacy trials conducted using stand-alone treatments of sulphur, zinc sulphate or zinc oxide and the pesticidal active ingredients were done in accordance with the standard recommended dosages for these active ingredients in India. However, it may be noted that the recommended dosages for each active ingredient may vary as per recommendations in a particular country, soil conditions, the cultivars, weather conditions, pest incidence etc.

Example 1: Bioefficacy of Sulphur+Zinc Sulphate+Fipronil WG and Cartap Granules

The trials were conducted in Bidhan Chandra Krishi Viswa Vidhyalaya of West Bengal state in India on kharif paddy on transplanted rice (GS-3). The experiments were conducted using Sulphur 90% WG standalone, Zinc Sulphate 33% WG standalone, Fipronil 0.3 Granules stand alone and Cartap HCL 4% Granules standalone used as standards for comparison as well as an untreated control. The treatments were replicated three times in a randomized complete block design on a plot size of 12 m² and keeping all the agronomic practices uniform for all the treatments.

It is to be noted that the larvae of *Scirpophaga incertulas* Walker cause dead hearts during vegetative stage and white ear heads during reproductive stage were observed.

The treatments were carried out by broadcasting granules on 20$^{th}$ day after transplanting on the paddy crop. To avoid intermixing of treatments, about 20 to 30 cm thick false bund boundaries were prepared all around plots having the treatments of granular insecticides.

The treatments applied were as indicated in Table 1.

It was also noticed that the application of Sulphur 78%+ ZnO 10%+Fipronil 0.6% Gr. at 9750+1000+62.5 g.a.i per ha (Treatment 8) proved to be effective and showed high number of tillers and high yield in comparison to Sulphur 90% WG at 6750 g.a.i per ha (Treatment 9), Fipronil 0.3 Gr at 75 g.a.i per ha (Treatment 11) used alone and Sulphur 65%+ZnO18% pastilles (prior art fertilizer composition) at 8125+1800 g.a.i per ha (Treatment 7). It was further observed that the composition showed dispersibility greater than 90% when added to water.

It was observed that the application of Sulphur 65%+ ZnO18% pastilles (prior art fertilizer composition) at 8125+ 1800 g.a.i per ha (Treatment 7) did not exhibit dispersibility in water and were observed to settle down when added to tanks containing water.

It was also observed that the application of Sulphur 30%+ZnSO4 45%+Cartap HCL 10% Gr. at 3750+1856+

| Treatments | Compositions | Active ingredients (grams/hectare) | Formulation dosage in gm/ha | Number of effective tillers | Grain yield (t/ha) | Straw yield (t/ha) |
|---|---|---|---|---|---|---|
| 1 | Sulphur 80% + ZnSO4 5% + Cartap HCL 2% Gr. | 10000 + 206 + 250 | 12500 | 18.43 | 5.12 | 5.68 |
| 2 | Sulphur 50% + ZnSO4 25% + Cartap HCL 5% Gr. | 6250 + 1030 + 625 | 12500 | 22.47 | 5.75 | 6.21 |
| 3 | Sulphur 30% + ZnSO4 45% + Cartap HCL 10% Gr. | 3750 + 1856 + 1250 | 12500 | 21.15 | 5.77 | 5.72 |
| 4 | Sulphur 40% + ZnSO$_4$ 50% + Fipronil 0.3 Gr. | 5000 + 2062 + 37.5 | 12500 | 20.78 | 5.21 | 6.22 |
| 5 | Sulphur 50% + ZnSO$_4$ 30% + Fipronil 0.4 Gr. | 6250 + 1237 + 50 | 12500 | 23.21 | 6.21 | 7.23 |
| 6 | Sulphur 80% + ZnSO$_4$ 10% + Fipronil 0.5% Gr. | 10000 + 412 + 62.5 | 12500 | 20.73 | 6.35 | 6.32 |
| 7 | Sulphur 65% + ZnO18% pastilles (Prior art) | 8125 + 1800 | 12500 | 20.00 | 4.68 | 5.76 |
| 8 | Sulphur 78% + ZnO 10% + Fipronil 0.6% Gr. | 9750 + 1000 + 62.5 | 12500 | 22.58 | 5.92 | 6.15 |
| 9 | Sulphur 90% WG | 6750 | 7500 | 18.48 | 4.41 | 4.88 |
| 10 | ZnSO$_4$ (33%) powder | 4125 | 12500 | 17.37 | 3.22 | 4.20 |
| 11 | Fipronil 0.3 Gr | 75 | 25000 | 18.74 | 5.37 | 5.87 |
| 12 | Cartap HCL 4% Gr. | 1000 | 25000 | 18.36 | 5.23 | 5.66 |
| 13 | Untreated check | — | — | 13.74 | 3.17 | 3.42 |

It was observed that the three way application of Sulphur 50%+ZnSO4 25%+Cartap HCL 5% Gr at 6250+1030+625 grams (active ingredient). per ha (Treatment 2) at reduced dosages surprisingly showed more number of tillers and high yield of grain and straw in comparison to Sulphur 90% WG at 6750 g.a.i per ha (Treatment 9), ZnSO$_4$ (33%) powder at 4125 g.a.i per ha (Treatment 10) and Cartap HCL 4% Gr. at 1000 g.a.i per ha (Treatment 12) used alone.

It is also to be noted that the three way application of Sulphur 50%+ZnSO$_4$ 30%+Fipronil 0.4 Gr. at 6250+1237+ 50 grams (active ingredient). per ha (Treatment 5) at reduced dosages also showed more number of tillers and high grain and straw yield in comparison to Sulphur 90% WG at 6750 g.a.i per ha (Treatment 9), ZnSO$_4$ (33%) powder at 4125 g.a.i per ha (Treatment 10) and Fipronil 0.3 Gr at 75 g.a.i per ha (Treatment 11) used alone.

1250 g.a.i per ha (Treatment 3) was highly effective in comparison to stand alone application of Sulphur 90% WG at 6750 g.a.i per ha (Treatment 9), ZnSO$_4$ (33%) at 4125 g.a.i per ha (Treatment 10) and Cartap HCL 4% WP at 1000 g.a.i per ha (Treatment 12)

Apart from controlling the larvae of *Scirpophaga incertulas*, the composition in varying concentrations also displayed a valuable impact on the physiological factors like improved foliage (greenness) in paddy and an increase in the number of tillers, contributing to higher yield.

The above compositions serve a dual purpose of simultaneously managing the damage caused by shoot borer and meeting the sulphur and zinc requirements in the initial stages of plant growth with a reduced number of applications. The composition is thereby more economical and beneficial to the end-users when compared with the present practices of solo application of fipronil granules, zinc and sulphur fertilizer that saves not only the additional labour but also the vital cost of solo Sulphur fertilizer.

Example 2: Bio-Efficacy of Sulphur+Zinc Sulpahate+Imidacloprid Granule

The trial was conducted in Lucknow district of Uttar Pradesh State in India on sugarcane. The experiments were conducted using Sulphur 90% WG standalone, Imidacloprid 70% WS standalone and Zinc Sulphate 33% standalone used as standards for comparison as well as an untreated control. The treatments were replicated four times in a randomized complete block design and keeping all the agronomic practices uniform for all the treatments.

It is to be noted that all the treatments were applied at $45^{th}$ DAP (Days after planting) and 25 suckers were planted in a row for each treatment, along with setts of furrows at the time of planting and the same dose were applied It is also to be noted that the combination and the insecticide used alone with the untreated check were evaluated against termites on sugarcane.

The data represents the cumulative presentation after both the application (at planning and at 50th Days after planting)

The germination percentage was noted down in all the treatments and replications

TABLE 2

| Treatments no | Composition | Active ingredients (grams/hectare) | Formulation dosage in gm/ha | Mean germination percentage after $50^{th}$ DAP | Yield (ton/ha) |
|---|---|---|---|---|---|
| 1 | Sulphur 75% + ZnSO$_4$ 20% + Imidacloprid 0.1 | 11250 + 990 + 15 | 15000 | 80 | 98 |
| 2 | Sulphur 35% + ZnSO$_4$ 45% + Imidacloprid 0.3% Gr. | 6300 + 2673 + 54 | 18000 | 88 | 103 |
| 3 | Sulphur 30% + ZnSO$_4$ 60% Imidacloprid 0.5% Gr. | 5400 + 3564 + 90 | 18000 | 86 | 100 |
| 4 | ZnSO4 (33%) powder | 4125 | 12500 | 78 | 90 |
| 5 | Sulphur 90% WG | 6750 | 7500 | 75 | 85 |
| 6 | Imidacloprid 70% WS | 87.5 | 125 gm per 100 kg setts | 80 | 89 |
| 7 | Untreated check | — | — | 60 | 70 |

It was observed that the application of Sulphur 35%+ ZnSO$_4$ 45%+Imidacloprid 0.3% Gr. at 6300+2673+54 g.a.i per ha (Treatment 2) at reduced dosages as compared to standard practices, surprisingly proved to be highly effective, showed eighty eight percent of successful sett germination, with least percentage of termite attack and also showed maximum yield in comparison to Sulphur 90% WG at 6750 grams (active ingredient) per ha (Treatment 5), ZnSO4 33% at 4125 grams (active ingredient) per ha (Treatment 4) and Imidacloprid 70% WS at 87.5 grams (active ingredient) per ha (Treatment 6) used alone.

The three way application of Sulphur 30%+ZnSO$_4$ 60% Imidacloprid 0.5% Gr. at 5400+3564+90 (Treatment 3) also showed seventeen percent more germination and high yield in comparison to Sulphur 90% WG at 6750 g.a.i per ha (Treatment 5), ZnSO4 33% powder at 4125 g.a.i per ha (Treatment 4) and Imidacloprid 70% WS at 87.5 g.a.i per ha (Treatment 6) used alone.

The composition not only provided an effective control over termites but also displayed an increase in the thickness of the sugarcane stem. Besides the internodes length and eventually the height of the cane was significantly improved when compared with the treatment where sulphur and Imidacloprid used alone.

The composition also demonstrated various other benefits such as increase in the girth, height, internode lengths and thickness of the cane as compared to the observations with the use of imidacloprid alone.

The above composition in practice serves the purpose of simultaneously managing the damage caused by termites and the need of sulphur and zinc required in the initial stages of plant growth. The composition is thereby rendered highly economical and beneficial to the end-users when compared to the standalone compositions of Imidacloprid or sulphur or zinc sulphate. The above composition also restricts the undue loading of a carrier such as sand which is present upto a large extent in standalone pesticidal compositions

We claim:

1. An agricultural composition consisting of a blend of components, the blend of components comprising:
  a. at least one insecticidal active ingredient selected from the group consisting of: cartap, fipronil, pirimicarb, buprofezine, thiachloprid, acetamiprid, clothianidin, chloropyrifos, diafenthiuron, novaluron, flubendiamide, spirotetramat, thiamethoxam, imidacloprid or salts thereof in the range of 0.1% to 10% of the total composition;
  b. elemental sulphur in the range of 30% to 90% of the total composition;
  c. zinc in the range of 2% to 20% of the total composition; and
  d. at least one agrochemically acceptable excipient,
  wherein the components (a), (b) and (c) are present in the agricultural composition in respective amounts such that application of the agricultural composition to a crop provides a higher yield of the crop at a lower rate of application than application of a composition comprising fewer than all of the components (a), (b) and (c), wherein said agricultural composition is in the form of water dispersible granules, microgranules or broadcast granules comprising particles in the size range of 0.2 micron to 50 microns; and wherein the zinc is in the form of zinc oxide or zinc sulphate.

2. The agricultural composition of claim 1, where zinc is in the form of zinc oxide and is present in the range of 2.5% to 24.9% of the total composition.

3. The agricultural composition of claim 1, wherein zinc is in the form of zinc sulphate and is present in the range of 6% to 60% of the total composition.

4. The agricultural composition of claim 1, wherein the microgranules are in the size range of 0.1 mm to 0.5 mm.

5. The agricultural composition of claim 1, wherein the composition is in the form of broadcast granules, and wherein the broadcast granules are in the size range of 0.75 mm to 5 mm.

6. The agricultural composition of claim 1, comprising sulphur in the range from 30% to 90%, zinc in the range from 2% to 20%, Fipronil or salts thereof in the range from 0.2% to 0.8% and the at least one agrochemically acceptable excipient.

7. The agricultural composition of claim 1, comprising sulphur in the range from 30% to 90%, zinc in the range from 2% to 20%, Imidacloprid or salts thereof in the range from 0.3% to 4% and the at least one agrochemically acceptable excipient.

8. The agricultural composition of claim 1, comprising sulphur in the range from 30% to 90%, zinc in the range from 2% to 20%, Cartap or salts thereof in the range from 2% to 10% and the at least one agrochemically acceptable excipient.

9. The agricultural composition of claim 4, wherein the composition is in the form of microgranules or wettable powder or broadcast granules comprising particles in the size range from $1\mu$ to $50\mu$.

10. The agricultural composition of claim 5, wherein the composition is in the form of microgranules, wherein the microgranules are in the size range of 0.1 mm to 0.5 mm and comprise particles in the size range of $1\mu$ to $50\mu$.

11. The agricultural composition of claim 5, wherein the composition is in the form of broadcast granules, wherein the broadcast granules are in the size range of 0.75 mm to 5 mm and comprise particles in the size range of $1\mu$ to $50\mu$.

12. The agricultural composition of claim 1, wherein the composition is micronized or milled.

* * * * *